United States Patent Office 3,365,523
Patented Jan. 23, 1968

3,365,523
METHOD OF REMOVING ENCRUSTED SLAG FROM FURNACES
Edgar F. Stresino, Indianapolis, Ind., assignor to Union Carbide Corporation, a corporation of New York
No Drawing. Filed Dec. 9, 1964, Ser. No. 417,204
4 Claims. (Cl. 264—30)

This invention relates to encrusted slag removal, and more particularly to the removal of slag impregnated refractory material from the working face of a used furnace lining.

Broadly, the invention provides a method for removing slag impregnated refractory material from the working face of a used furnace lining, which comprises heating, melting and removing a selected portion of such material with the hot high velocity effluent from a steady flow oxy-fuel internal combustion burner, directed against such material at an acute angle with respect to such face.

According to the preferred form of the invention, there is provided a novel method of cleaning encrusted slag from used furnace linings, which involves the addition of a suitable flux, such as spar or calcium fluoride, to the combustion chamber of a steady flow, oxy-fuel combustion burner, the hot, high velocity effluent of which is directed against such linings at an acute angle, to heat, melt and remove objectionable encrusted, slag impregnated, refractory material therefrom.

Preferably, the amount of spar supplied to the combustion chamber is in a ratio with respect to the oxygen supplied to such chamber that the melting temperature of the slag impregnated refractory material is lowered, facilitating its removal, without substantially lowering the temperature of the high velocity effluent. Such ratio ranges up to 2 lbs. of calcium fluoride to 1 lb. of oxygen.

Recently it has been found feasible to patch used furnace linings such as those used in steelmaking by hot patching with the aid of flame spraying. An example of such a process is that described in co-pending applications Serial Number 286,886 filed June 5, 1963, now abandoned, and Serial Number 389,725 filed August 14, 1964. However, in order to effectively use such processes, it is desirable to first remove objectionable slag encrustations from the working face of the used linings. Such encrustations inhibit the adherence of repair patches. Since the melting temperatures of the objectionable encrustations are so high, their removal has in the past been extremely difficult.

It is, therefore, the main object of this invention to provide a method for removing slag encrustations from used furnace linings which is simple and economical.

Another object of the invention is to provide a basically new way of working refractory material.

United States Patent Number 2,861,900 to Smith et al., dated November 25, 1958 discloses, FIGURE 1, a steady flow, oxy-fuel, internal combustion burner which produces a hot, high velocity effluent, and means for supplying powder in a carrier gas to a confined combustion space or chamber. Such burner is preferably used in the present invention by directing the effluent from such burner at an acute angle with respect to the working face of a used furnace lining, for example, from which the slag impregnated refractory material is to be removed. The so-directed effluent is used to heat, melt and remove such material.

In order to lower the melting temperature of such material, without substantially lowering the temperature of such effluent, a flux such as calcium fluoride powder is continuously fed to the combustion chamber with the fuel which is preferably No. 2 Fuel Oil. Alternatively, the flux powder can be fed to the combustion chamber separately with the aid of a suitable carrier gas such as air. In any case, oxygen is also continuously fed to the combustion chamber.

The amount of spar or calcium fluoride that is fed to the combustion chamber is preferably in the ratio of a trace up to 2 lbs. of spar to 1 lb. of oxygen supplied to such chamber. This has the beneficial effect of greatly facilitating the removal of slag impregnated refractory material from the working face of a used furnace lining by materially lowering the melting point of such material, without substantially lowering the temperature of the effluent.

An actual working example of the invention is illustrated by the following data:

A panel of a dense magnesite refractory structure formed by the process of the above-mentioned co-pending U.S. application Serial Number 286,886 was cleaned by passing .4 lb./min. of $CaF_2$ through the burner of the above-noted U.S. 2,861,900. The burner was held at an acute angle of 45° to the panel. No. 2 Fuel Oil at the rate of 3.6 lbs./min. and oxygen at the rate of 8000 CFH (a weight ratio of 0.4 lb. $CaF_2$ to 11 lb. $O_2$) was fed to the burner as the combustible mixture. The burner was maintained at a standoff distance of from 7–10 inches from the panel. The burner was passed over the panel at a traverse speed of 880 i.p.m. in one direction and 220 i.p.m. in the other.

While the invention has proved to be highly suitable for cleaning slag encrustations from used furnace linings in preparation for flame deposited repair patches, it is also highly suitable for working refractory materials, such as cutting, sawing, welding and scarfing the same. Furthermore, the invention includes the novel method which comprises removing objectionable slag encrustations from a used furnace lining to provide a clean slag-free surface suitable for receiving a flame deposited refractory coating; as well as the additional step of also flame depositing a desired coating of refractory material directly on the so-cleaned surface. This results in a much better over-all repair job than has been possible in the past.

What is claimed is:

1. In a method for removing encrustations of slag impregnated refractory material from the working face of a furnace lining, the improvement comprising: heating, melting and removing said encrusted material with a hot, high velocity flame effluent emanating from a fuel-oxy internal combustion burner directed against said encrusted material at an acute angle with respect to said working face, and supply a fluxing material to the combustion chamber of said fuel-oxy burner to lower the melting point of said encrusted material without substantially lowering the temperature of said high velocity flame effluent.

2. The method of claim 1 wherein the fluxing material is calcium fluoride.

3. The method of claim 2 wherein the calcium fluoride is in the form of powder.

4. The method of claim 3 wherein the amount of calcium fluoride powder supplied to said combustion chamber is up to 2 pounds per pound of oxygen supplied to said burner.

References Cited

UNITED STATES PATENTS

| | | | |
|---|---|---|---|
| 714,565 | 11/1902 | Dunford | 264—30 X |
| 1,389,751 | 9/1921 | Garr et al. | 264—30 |
| 3,121,643 | 2/1964 | Eisenberg | 177—105.2 |
| 3,250,632 | 5/1966 | Alper et al. | 106—63 X |

ROBERT F. WHITE, *Primary Examiner.*

J. A. FINLAYSON, *Assistant Examiner.*